United States Patent
Morgan et al.

(10) Patent No.: US 9,930,303 B1
(45) Date of Patent: Mar. 27, 2018

(54) METHODS AND APPARATUS FOR SHALLOW GRADIENT ARTIFACT REDUCTION IN IMAGE DISPLAY SYSTEMS

(71) Applicant: Texas Instruments Incorporated, Dallas, TX (US)

(72) Inventors: Dan Morgan, McKinney, TX (US); Jeffrey Matthew Kempf, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/351,308

(22) Filed: Nov. 14, 2016

(51) Int. Cl.
*H04N 9/31* (2006.01)

(52) U.S. Cl.
CPC ......... *H04N 9/3123* (2013.01); *H04N 9/3155* (2013.01); *H04N 9/3164* (2013.01); *H04N 9/3179* (2013.01)

(58) Field of Classification Search
CPC .. H04N 9/3123; H04N 9/3155; H04N 9/3164; H04N 9/3179
See application file for complete search history.

(56) References Cited

U.S. PATENT DOCUMENTS

| | | | | |
|---|---|---|---|---|
| 5,309,188 | A * | 5/1994 | Burstyn | G02B 27/1026 349/8 |
| 2015/0091932 | A1* | 4/2015 | Buckley | G09G 3/2022 345/589 |
| 2016/0378117 | A1* | 12/2016 | Szatmary | B25J 5/00 382/153 |

* cited by examiner

*Primary Examiner* — Paulos M Natnael
*Assistant Examiner* — Sean Haiem
(74) *Attorney, Agent, or Firm* — Michael A. Davis, Jr.; Charles A. Brill; Frank D. Cimino (57) ABSTRACT

In described examples, a method includes: receiving an array of image data pixels for display by a spatial light modulator; dividing the array of image data pixels into a plurality of blocks. For the blocks of the plurality of blocks, the method includes: computing a mean value for pixels in the block; computing a variance for pixels in the block; and, in response to the mean value and the variance, retrieving an indicator of a likelihood of a visible artifact for the block; and in response to the retrieved indicator, outputting a signal to selectively increase or reduce a load time of the spatial light modulator for displaying the array of image data pixels.

25 Claims, 8 Drawing Sheets

BLOCK SIZE = 120 PIXELS x 120 LINES
DECIMATED HORIZONTAL RESOLUTION = 16
DECIMATED VERTICAL RESOLUTION = 9
INDEX IN EACH BLOCK DESCRIBES WHICH COUNTER (OUT OF BANK OF 32) TO USE

METHODS AND APPARATUS FOR SHALLOW GRADIENT ARTIFACT REDUCTION IN IMAGE DISPLAY SYSTEMS

TECHNICAL FIELD

This relates generally to image display systems, and more particularly to image display systems using spatial light modulators.

BACKGROUND

Spatial light modulators (SLMs) including digital micromirror devices (DMDs), liquid crystal display (LCD) devices and liquid-crystal-on-silicon (LCOS) devices are useful in displaying images using optical projection. The optical projection systems (which can include televisions, video displays, projectors and portable projectors) include two parts, which are: an illumination system for generating and collecting the light rays needed to illuminate an image; and a projection system for collecting the illuminated image light rays into a projection lens that projects the final image for viewing. At least one SLM receives the illumination light rays from the illumination system, modulates the light received with image data for visual display, and transmits modulated image light rays for projection to the projection system. In many current systems, the SLM is an array of reflective pixel elements. In certain examples, the SLM pixel elements can be digital micromirrors of a DMD that receive digital image data and move to either reflect or not reflect the illumination light, forming an image corresponding to the digital image data.

In conventional video projection systems using SLMs, image data for projection are can be arranged in frames. The frames are subdivided into bit frames that are projected in sequences during a frame display time. To provide continuous motion to a human eye, a frame rate of at least 60 frames per second (FPS) must be used. However, using faster frame rates, such as 120 FPS, improves the image appearance by reducing visible artifacts (visible artifacts are unintended visible elements that can appear in the displayed image due to the physical characteristics of the display system). Each bit plane can be displayed for a portion of a frame display time. Also, a time weighted display of the bit planes can be used to provide various intensity values. If a bit plane is shown for a greater portion of a frame display time, then a greater intensity will be observed in the displayed image. Pulse width modulation (PWM) of display sequences for the bit frames provides intensity control of the bit planes. Further, sometimes bit planes are split. When split bit planes are used, a sequence for bit plane display can repeat for those split bit planes in a frame that have a higher intensity weighting.

In conventional digital image projection systems, visible artifacts can appear to the viewer in the displayed image at "code boundaries." Code boundaries occur where the set of bit planes forming adjacent gray shades are very out of phase (time phase) with one another. Examples of these visible artifacts include PWM temporal contour artifacts (or simply "PWM artifacts"). The PWM artifacts are associated with contouring in the displayed image, because an apparent physical boundary can appear if viewers move their eyes around a contour area in the displayed image. A viewer's eyes are simultaneously collecting and integrating light from both sides of the code boundary. Because the integrated light seen on both sides of the code boundary is out of phase in time, a PWM artifact can be seen. This PWM artifact is not part of the desired image and should not appear in the displayed image, but is nonetheless visible to the human viewer due to the operations of the conventional image display system.

SUMMARY

In described examples, a method includes: receiving an array of image data pixels for display by a spatial light modulator; dividing the array of image data pixels into a plurality of blocks. For the blocks of the plurality of blocks, the method includes: computing a mean value for pixels in the block; computing a variance for pixels in the block; and, in response to the mean value and the variance, retrieving an indicator of a likelihood of a visible artifact for the block; and in response to the retrieved indicator, outputting a signal to selectively increase or reduce a load time of the spatial light modulator for displaying the array of image data pixels.

DETAILED DESCRIPTION OF EXAMPLE EMBODIMENTS

Corresponding numerals and symbols in the different figures generally refer to corresponding parts unless otherwise indicated. The figures are drawn to clearly illustrate the relevant aspects of the illustrative example arrangements and are not necessarily drawn to scale.

The term "coupled" can include connections made with intervening elements, and additional elements and various connections can exist between any elements that are "coupled."

A description of a data transmission may refer to a "line." However, the term "line" when used for data from an array can also refer to a row or to a column, and these terms can be used interchangeably herein. Some SLM controllers transmit lines of data, while other SLM controllers transmit columns. Accordingly, in an array of pixels for a SLM, the terms "row" and "column" of pixels are interchangeable, and the terms "line," "row," and "column" can all be used.

Mitigation of PWM temporal contour artifacts (or simply "PWM artifacts") can be accomplished by increasing the data rate between a spatial light modulator (SLM) and its controller device, and displaying more bit planes in a given time period to reduce the visibility of these artifacts. Faster SLM load times are needed to use the additional bit planes. The faster SLM load times allow the integrated light energy from the bit-planes on the two sides of a major PWM boundary to be closer together in time phase.

To achieve the faster SLM load times, a higher speed data transfer occurs at the interface to the SLM, and the controller ASIC device operates at higher processing speeds. But the use of faster data rates, higher data bandwidth, and higher processing speeds consumes additional power in the system. Portable applications for image display systems are increasing including portable projectors and digital projectors integrated into portable devices. Examples include laptops, notebooks, PDAs and smartphones that are battery powered. The applications for video display or projection that require reduced power consumption are increasing. As an example, some smartphones include a "pico-projector" that uses a DMD display system formed entirely within a cellphone. The pico-projector projects images such as a movie or a visual presentation onto a wall or screen for viewing.

Example embodiments determine whether an area of pixels in an image for display at a spatial light modulator (SLM) is likely to produce a PWM contour temporal artifact. If the determination is true, the method reduces the SLM load time. The method then displays additional bit planes at a higher rate. If the determination is false, the method determines that an area of an image is unlikely to produce a PWM contour temporal artifact, and the SLM load time is increased and fewer bit planes are used to display a frame. The method adaptively adjusts the SLM load time and the number of bit planes displayed on an ongoing basis. Use of the method reduces the likelihood that visible PWM artifacts occur and simultaneously reduces the overall power consumed by the display system.

Figure 1:
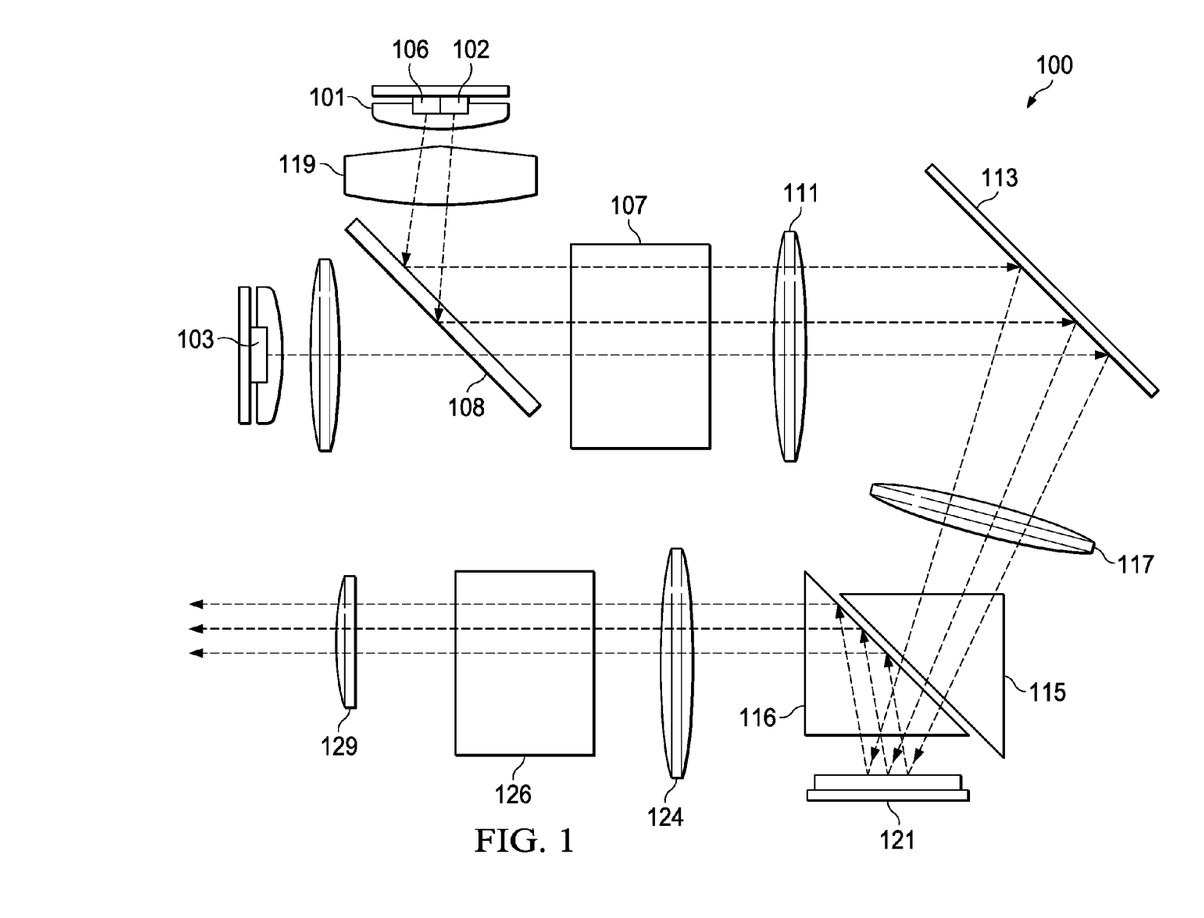
FIG. 1 is a block diagram for an optical projection system.

FIG. 1 is a block diagram of a projection system 100 using reverse total internal reflection (RTIR) projection architecture. In an RTIR architecture, an RTIR prism is in a projection path between a spatial light modulator and the projection optics, as is further described below. However, use of example embodiments is not limited to a particular illumination system or to a particular projection system.

In the projection system 100, illumination is by red, green and blue (RGB) LEDs 102, 103 and 106. However, alternative illumination sources can be used, such as incandescent lamps with reflectors, single lamps with color wheels, lasers, and laser-phosphor illumination. The LEDs can include an optical coating or collimating optics 101 that acts to collect and collimate the light output by the LEDs. Also, in FIG. 1, two LEDs 102 and 106 are on a single integrated device, such as the red and green LED devices, while the blue LED 103 is a separate component. In alternative systems three individual LEDs are used, and two dichroic plates in the form of an X box shape can be used to combine the three colors (RGB) into an illumination source. In the particular example shown in FIG. 1, dichroic plate 108 reflects the light from red LED 106 at one surface, reflects the light from green LED 102 at a second surface, and passes the light from blue LED 103 through and to the illumination path. In alternative arrangements, multiple LEDs can be used instead of one LED for each color. Color wheels can be used with white illumination light to create the colors. The colors used for illumination are not limited to red, green and blue and alternative colors known in other schemes for projecting color images include cyan, magenta, and yellow.

In FIG. 1, an additional collimator 119 is between the LEDs 102, 106 and the dichroic plate 108. Collimators perform the function of reducing the diverging angle of the light beam. Integrator 107 is in the illumination path after the dichroic plate 108. The integrator 107 can be: a "fly's-eye" integrator (also referred to as a lens array); a rod integrator; or a tube integrator. The integrator 107 produces a more homogeneous light beam that is transmitted through one or more relay lenses such as relay 111. Relay lenses such as 111 can extend the length of the illumination path, and are optional.

In system 100 of FIG. 1, mirror 113 folds the illumination light path. Mirror 113 also enables the illumination light rays to reach the SLM 121 (which can be a digital micromirror device) at an angle. Because the digital micromirror device (DMD) modulates the light by tilting reflective mirrors, the illumination rays must strike the mirrors at an angle. Use of the tilting mirror 113 makes control of the angle of the illumination rays easier to achieve. Additional relay optics, such as 117, can be placed between mirror 113 and the SLM 121.

Use of a reflective spatial light modulator such as a DMD for SLM 121 requires that the illumination light rays from mirror 113 that are entering the SLM 121 package, and the reflected image light rays leaving the SLM 121, be physically separated to avoid interference. This can be seen by examining FIG. 1. An RTIR prism can separate the incoming illumination rays from the image rays that are being transmitted into the projection optics. U.S. Pat. No. 5,309,188, entitled "Coupling Prism Assembly and Projection System Using Same," which is hereby incorporated by reference in its entirety herein, discloses a prism arrangement using total internal reflection to separate the illumination and projection light paths in a small space. As shown in FIG. 1, wedge prism 115 and TR prism 116 form a coupling prism that accomplishes the separation of the illumination light rays directed onto the spatial light modulator 121 from the image light rays coming from the spatial light modulator. In FIG. 1, the image light rays exit prism 116 and enter into a projection system that includes optical elements 124, 126, and 129.

Figure 2:
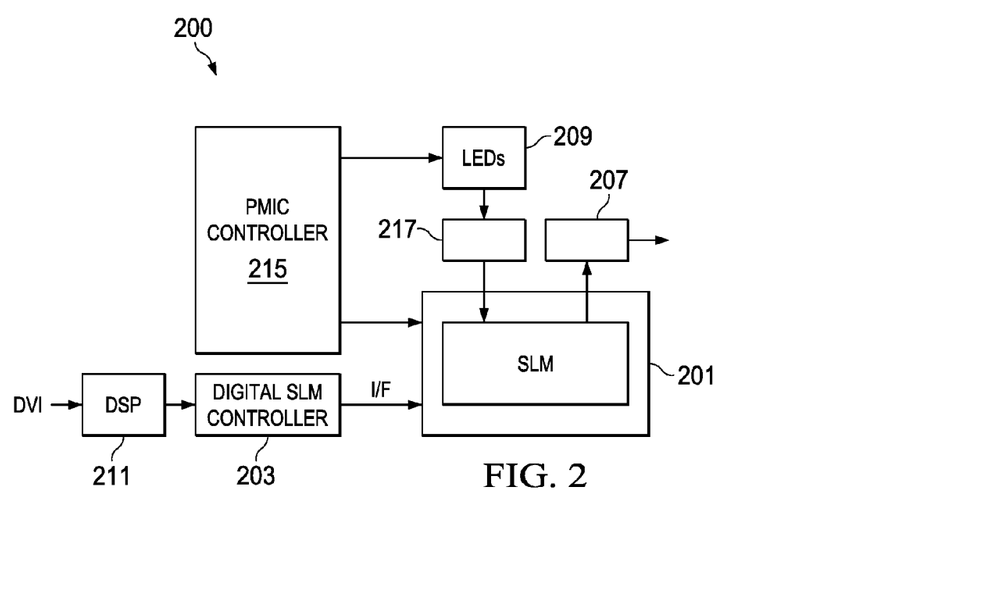
FIG. 2 is a block diagram for a portion of a digital image projection system.

FIG. 2 is a block diagram illustrating a typical arrangement 200 for use with the optical projection system described hereinabove. A microprocessor 211 executes instructions that cause it to output digital video signals for display. The microprocessor 211 can be implemented using: a mixed signal processor (MSP); a digital signal processor (DSP); a microcontroller unit (MCU); or by another programmable device. A variety of sources may provide the digital video signals, labeled DVI in the figure, including: television transmitters; cable boxes; internet browsers; stored files in video cards; flash cards; USB drives; cameras; computers; game consoles; and camcorders. The microprocessor 211 couples to digital SLM controller 203. Controller 203 is a video processing integrated circuit. Controller 203 can be a customized integrated circuit or an application specific integrated circuit (ASIC). An analog circuit configured to manage power and LED illumination referred to as a "power management integrated circuit" (PMIC) numbered 215 is shown in FIG. 2. The PMIC Controller 215 controls the intensity and power to the LEDs 209. SLM controller 203 provides digital data to the SLM 201 for modulating the illumination light, and the PMIC controller 215 provides power and analog signals to the SLM 201.

In operation, the light rays from the illumination sources LEDs 209 are input to illumination components in block 217 such as the cover prism and wedge described hereinabove, and strike the reflective mirrors inside the package of SLM 201 when SLM 201 is a reflective spatial light modulator, such as a DMD. The reflected light for projection leaves the surface of the SLM 201 and travels into the projection optics 207. Projection optics 207 project the image for viewing.

Example integrated circuits that can implement the system 200 shown in FIG. 2 include: DMD controller ICs available from Texas Instruments Incorporated, such as the DLPC3430 DMD controller; and the Texas Instruments DLPC2601 ASIC device that provides both digital and analog controller functions. Analog DMD controller devices that can implement circuit 200 include the DLPA2000 device available from Texas Instruments Incorporated. LED controller devices are useful to power the LEDs. Any one of a number of DMD devices available from Texas Instruments Incorporated can implement the spatial light modulator SLM. In alternative arrangements, other commercially available SLMs can be used, such as LCOS devices.

In FIG. 2, a high speed data interface (labeled "I/F") couples signals from the DMD controller 203 to DMD device 201. In one approach, a complete set of pixel data is transmitted to the DMD many times per second. For example, if the incoming data frame rate is 60 Hz, the interface can receive pixel image data for three different colors (red, green, and blue) 60 times per second, per color.

The use of digital data for image display is convenient for data processing and storage. Projecting data from a frame buffer at discrete time periods is very practical when using a pixel array formed of addressable elements that "latch" the current value. A DMD device includes an addressable storage element for each pixel. However, the human visual system (HVS) is an analog system, and certain steps are necessary to break up the projected images into smaller portions that update the images frequently to avoid the appearance of unwanted visible artifacts that can occur due to the use of digital image data.

A "frame display time" can be determined using the typical metric of "60 frames per second" as the minimum display rate needed for the HVS to see continuous motion in an image displayed for viewing. However, when color is used and when some portions of the image have multiple colors, faster frame rates reduce or avoid "rainbows" and other visible artifacts that can sometimes be observed when displaying digital image data. For example, a 2× rate of 120 frames per second may be used.

"Bit planes" can be defined to format images for display by an SLM and also to further improve the images for display to the HVS. Because the pixel elements for a binary SLM are either "on" or "off," the intensity observed for a particular pixel can be determined by the amount of time that pixel is "on" during the frame display time. The image data into a DMD controller can include several bits for each pixel, for each of the colors, to represent the desired color intensity for a particular frame. A mapping creates the intensity levels needed for each pixel during the frame display time at the spatial light modulator. The mapping is needed because the spatial light modulator is a binary display device that is either "on" or "off." By subdividing the frame display time into bit planes, each having a bit for each of the pixels in the two-dimensional array at the spatial light modulator for each bit plane, a variety of intensities, corresponding to a "gray scale" for one color, can be achieved. If the pixel is "on" for the entire display time, it will have a maximum brightness or intensity. If the pixel is "off" for the entire time, it will be dark, or have a minimum brightness or intensity. By using the bit planes, the entire range of color intensity available can be reproduced using the one-bit per pixel available in the SLM.

Further, a weighting function can be used, so that the bit planes may have non-uniform display times. For example, a first bit plane may be displayed for half the frame display time, a second bit plane for one quarter of the frame display time, a third bit plane for a smaller portion, and a fourth bit plane for a still smaller time portion.

Also, the bit plane display times can be broken up to better adapt the display of the bit planes to the workings of the HVS. In an example, the first bit plane can be displayed twice in a rotation, for two different times, thus the image being displayed at the SLM updates more frequently. The HVS will perceive fewer artifacts with additional breaks in the image being projected. Because the time that each bit plane displays at the DMD is non-uniform, the pulses transmitted to the DMD array are pulse width modulated, the width of the pulses corresponding to the relative intensity weight given a particular bit plane. The pulse width modulation (PWM) sequences therefore control the intensity for the pixels.

In image display projection systems using binary SLMs, the SLMs have only one bit of storage per pixel. The picture elements, or pixels, contain a latch and a movable reflective device associated with the latch, such as a micromirror. While a particular pixel value is displayed by the DMD, a single bit memory cell located adjacent to the pixel can be loaded with the next pixel value for display. When the line or the array of pixel data is loaded, a "reset" will cause all of the pixel elements to update (latch) the next value for display, and the one-bit storage loading process can begin again. The time required to reset and load the pixel array with the next bit frame affects how fast the data can display on the SLM.

Figure 3:
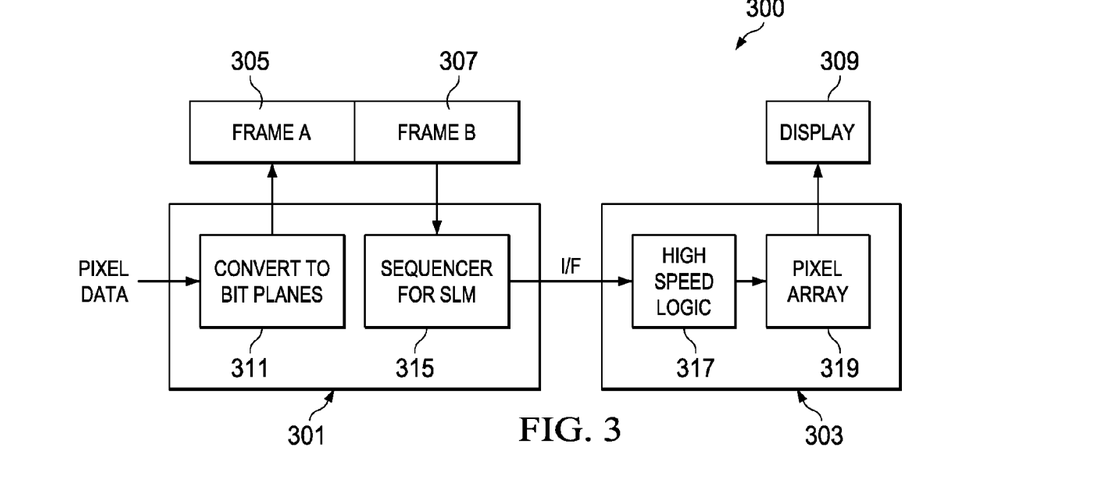
FIG. 3 is a block diagram for a datapath portion of an optical projection system.

FIG. 3 is a block diagram for a system 300 that includes portions of the data path for a digital imaging system. System 300 includes SLM controller ASIC 301 and a SLM device 303. In operation of system 300, the DMD controller 301 receives pixel data. A block 311 converts the incoming pixel data, which has multiple bits for each color for each pixel, into bit planes. In an example, a frame for display can include colors red, green and blue and can include 8 bits per pixel for each color, or 24 bits for each pixel. Alternative arrangements can use fewer less, or more, bits per pixel. The conversion block 311 converts the image frame data received into bit planes and stores the bit planes in a frame buffer 305 (FRAME A). Also, the image data can be formatted before writing the data to the frame buffer 305. In a second frame buffer 307 (FRAME B), the data is read from the frame buffer 307. By switching between the two frame buffers 305 and 307, the frame being read for transmission to the SLM is separated from the frame being written with bit planes corresponding to incoming image data, enabling the system 300 to operate continuously. While the system 300 is receiving data, converting and writing bit planes to a first frame buffer, it is also simultaneously reading bit plane data from a previously loaded frame buffer. After the data is read from the frame buffer such as 307 in FIG. 3, additional data formatting can be performed to prepare the data for transmission on the high speed interface labeled "I/F." For example, in a packet data interface, the data packets can be formatted for transmission on the interface I/F by the sequencer 315.

To prepare the image data for display for viewing by the HVS, as explained hereinabove, bit planes are displayed during each frame display time period. The bit planes can include three colors for each pixel and are arranged to create the desired pixel intensity. However, as the number of bit frames increases in an image display period, the data bandwidth required also increases, requiring higher numbers of bit frames and more data storage, with more data traffic over the interface I/F coupling the ASIC controller such as 301 to the SLM 303.

To break up the changes in the image to provide better displayed image quality with few or no visible artifacts, the number of bit planes transmitted to the SLM can be increased from 24 (8 bits per pixel for 3 colors) to 60 or more, with some repeating. In a typical application, some of the bit planes are repeated, and all of the pixel data for each bit plane is transmitted over the data interface I/F to the SLM device 303. Blocks 311 and 315 in the controller circuit 301 provide formatting that creates the bit planes from the read frame buffer and then transmits these bit planes to the SLM 303 on the data interface I/F.

As shown in FIG. 3, SLM 303 includes high speed logic 317. DMD controller 301 receives pixel data and transmits data to the high-speed logic 317, which writes the storage cells for the mirror array into pixel array 319. When the entire array, a line or another portion is ready, a "reset" to the DMD pixels causes the selected pixels to update with the data from the storage cells and the pixels then display the new image corresponding to the bit plane. The load and reset process is repeated for all of the bit planes for a particular image display time to provide the color and intensity information for viewing. The image is displayed by illuminating the DMD mirrors. The reflected images leaving the DMD mirrors are projected at a display 309 such as a screen. The display is reset each time a bit plane is loaded, so that all of the bit planes for a given frame are displayed in a sequence during the frame display time.

In an example with an image display having four bit planes (referred to as bit planes 0-3) for a given color that are to be displayed during a predetermined color display time, each bit plane can have an associated time weighting. The weights might be 1, 2, 4, and 8. Based on the sum of the time weights, which in this example is 15, the associated display time proportion for bit planes 0, 1, 2, 3 might be: 1/15; 2/15; 4/15; and 8/15. When a particular bit plane is displayed with multiple instances, the total display time will still match the corresponding display proportion. When a bit plane is displayed with more than one instance in a display time, the bit plane is referred to as being "split." For example, in a bit plane sequence of '30213', bit plane 3 is a "split" bit plane.

In example embodiments, an image display system reduces or eliminates PWM contour temporal artifacts (or simply "PWM artifacts"), and simultaneously reduces power consumption (compared to conventional approaches). In example embodiments, the image data is continuously adapted to avoid the PWM contour artifacts for areas of images where the visible PWM artifacts are likely to occur.

Figure 4:
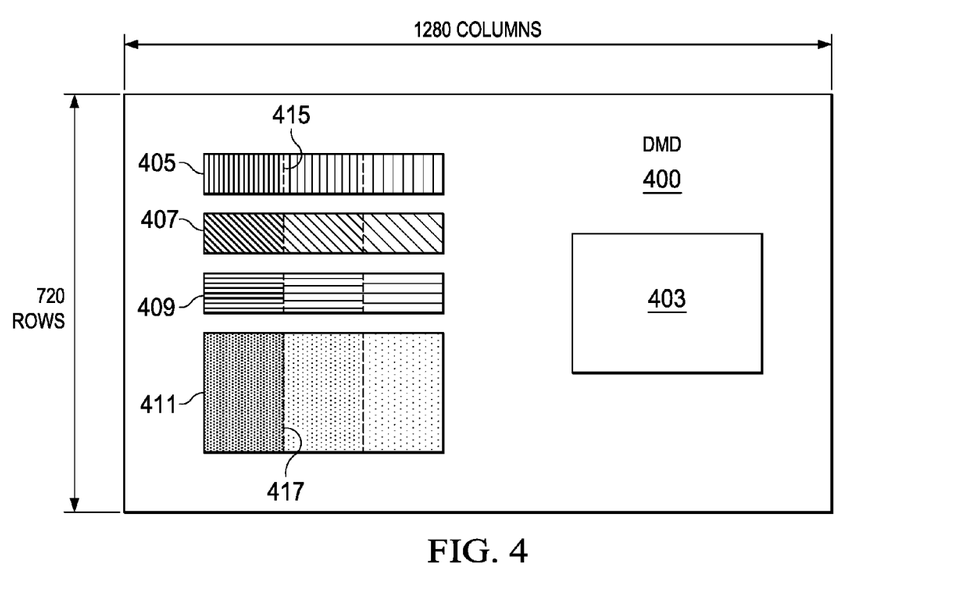
FIG. 4 illustrates a frame for display in an image display system, including regions likely to produce visible artifacts.

FIG. 4 illustrates an image 400 for display by a system incorporating example embodiments while using a DMD as a spatial light modulator. In alternative embodiments, other SLM types are used. In FIG. 4, an example image 400 has 1280 columns by 720 rows of pixels, or 921,600 pixels. In image 400 of FIG. 4, area 403 is free from gradients. When this portion of the image is displayed, pulse width modulated temporal contour artifacts are unlikely to be visible to a human viewer, even if a long load time (reduced data rate) is used for the SLM, because area 403 has no code boundaries where code transitions in the bit plane values will occur. Accordingly, the brightness in area 403 is uniform. Area 403 is considered "flat."

In contrast, the areas 405, 407 and 409 of FIG. 4 are shaded and correspond to red, green and blue areas. Further, area 411 represents a gray area. Each of these areas has a gradient between darker and brighter regions. Accordingly, in each of these areas, the brightness varies from a bright area to a darker area across the area, which forms a contour. Each of these areas 405, 407, 409, and 411 is likely to have visible artifacts in a displayed image if a long load time (reduced data bandwidth) is used for the displaying the image at the SLM. The visible artifacts are likely to occur because code transitions will be in the pulse width modulation sequences used to display this portion of the image. Lines 415 and 417 indicate boundaries in these areas where code transitions are likely to result in visible artifacts.

If a long load time (lower data bandwidth and thus lower power) is used for displaying images with areas including shallow gradients (such as areas 405, 407, 409 and 411 in FIG. 4) to reduce power consumption, then visible artifacts are more likely to appear in the displayed images due to the code transition boundaries in the PWM sequences. If the load times for the SLM are instead kept fairly short to avoid these visible artifacts (using a fixed higher data rate), then power consumption increases, which is undesirable.

The example embodiments provide an adaptive algorithm that reduces power consumption and that simultaneously reduces visible PWM temporal contour artifacts in displayed images. In example embodiments, the load time for the SLM is adapted when a shallow gradient detector (SGD) algorithm performed on the data for the images indicates that artifacts due to PWM temporal contouring are likely to occur. If the SGD algorithm indicates a likelihood visible artifacts will occur, the spatial light modulator load time for that frame is reduced (data bandwidth is increased by increasing the number of bit planes for display). The reduced load time and higher data rate avoids visible artifacts in the displayed images. However, in many cases the SGD algorithm will indicate that the frame for display will not be likely to produce visible PWM contour artifacts. When the SGD algorithm indicates no visible artifacts are likely, the SLM load time is increased, reducing the number of bit planes to be displayed in a given time period (lowering the data bandwidth) and thereby lowering the power consumed. On average, use of example embodiments reduces the power consumption in systems using spatial light modulators to display images (compared to conventional projection systems). By adaptively changing the SLM load time using example embodiments, the power consumed by the display system can be reduced without increasing the likelihood that visible artifacts occur. Alternatively, visible artifacts that sometimes appear due to PWM contour effects can be greatly reduced or even eliminated without increasing the power consumption of a display system.

Some possible visible PWM temporal contour artifacts may remain. For example, the number of potentially visible artifacts can be kept below a predetermined or programmable threshold where the average human viewer will be able to visibly perceive the artifacts. By evaluating the images before display, the algorithms of example embodiments identify areas or frames for display that will likely result in visible artifacts. Before display of those areas or frames, the SLM load time can be reduced (the number of bit planes and split bit planes can be increased) to address only those identified areas. While reducing the SLM load time for these areas will result in an increase in instantaneous power consumption, for most images and for most areas of images for display the SGD algorithms will confirm that a longer SLM load time, with fewer bit planes for display and corresponding lower power consumption, will suffice. The use of example embodiments thus results in lower average power to display images. Power consumption is important for battery powered and portable device applications, such as projectors using DMDs to display images from: a cellphone; a PDA; a notebook computer; a tablet computer; a laptop computer; a portable video player; a camera; or a camcorder.

The SGD algorithms of example embodiments evaluate the images while the images are processed for display. The SGD algorithms determine the likelihood that a satisfactory image display can be projected using a long SLM load time, and if the algorithm determines this is not possible, the system adaptively decreases the SLM load time. In one example, a system implements two load times for the SLM. In other alternative arrangements, the system can implement a variety of load times and the corresponding PWM sequences provide additional flexibility. However, for the purposes of clarity in the explanation herein, two load times are shown in the illustrative examples.

In the embodiments, the SGD algorithm is performed in a digital controller circuit for the SLM. The SLM receives bit planes formed by the digital controller circuit and a load time signal indicating a fast load time, or a slow load time. The digital controller circuit provides the bit planes as line data transmitted over a data interface to the SLM.

In an example system using the SGD algorithm of example embodiments, image data is received in a digital controller circuit coupled to an SLM. In the digital controller circuit, the image is divided into blocks of a convenient size for processing. Within each block, the image content is evaluated to determine whether, for a selected block, an objectionable shallow gradient exists that could cause a visible PWM contour artifact when displayed. In some arrangements, the block size may be predetermined and fixed. In other alternative arrangements, the block size can be programmable to give additional flexibility. Also, in some alternative arrangements, the sensitivity of the SGD algorithm to determine when a block or an image is likely to result in objectionable contour artifacts is also adjustable. In one embodiment the adjustment can be made by programming a sensitivity setting. In an alternative approach, the adjustment can be made by making a selection from a group of predetermined sensitivity settings. The sensitivity settings can be implemented as values stored in an addressable two-dimensional look up table. Alternatively, the sensitivity settings can be provided as retrievable values that are indexed or addressable.

In one example method, a one-bit flag value is created and stored for each block in a memory coupled to the digital controller circuit or within the digital controller circuit. The one-bit flag indicates whether, for the corresponding block, displaying the block is likely to result in visible PWM artifacts. In one approach, for each image, a running sum is maintained by the digital controller circuit that adds the one-bit flag values as the individual blocks are individually evaluated. The method forms a global sum corresponding to how many blocks in an image frame are determined to be sensitive to PWM artifacts for the whole image. At the end of the image processing for the frame, the global sum can be compared to a threshold global sum. The threshold can be stored in the digital controller circuit or in a memory. The threshold global sum is for use in making a decision of whether the image is one that requires a fast (short) SLM load time, or whether a slower (longer) SLM load time would render an acceptable displayed image. The digital controller circuit then outputs the corresponding load time signal to the SLM.

In one example embodiment, the SGD algorithm begins by determining, for each block in an image frame, the mean and a variance. A memory such as a two-dimensional lookup table is then addressed using the mean and the variance values to determine whether a selected block is likely to produce PWM temporal contour artifacts in a displayed image. Sensitivity information is stored in the two-dimensional lookup table for the mean and variance values. If the determination is true, then a single bit flag is set for the particular block responsive to the sensitivity information retrieved from the two-dimensional lookup table. Conversely, if the determination is false, then the single bit flag is cleared for the particular block. The flag value is stored for each block. After all of the blocks in an image frame are evaluated, the sum of the set flags is calculated for an entire frame to be displayed by the SLM. If that frame summation value equals or exceeds a threshold, then an output flag is set by the digital controller circuit to thereby indicate that the system should use a higher bandwidth sequence (having a faster SLM load time that increases power consumption) to display the image frame. Using the faster SLM load time for that image will avoid objectionable PWM artifacts that might otherwise occur in the visible image. Conversely, if that frame summation value is below the threshold, then the output flag is cleared to thereby indicate that the system should use a lower bandwidth sequence (having a slower SLM load time that reduces power consumption) to display the image frame. The stored block flags can then be cleared to prepare for processing the next image frame.

As used herein, the term "variance" is not restricted to a particular mathematical definition, but may instead be any performance metric of how much a selected block's pixel values are varying from the mean values. In various alternatives, different metrics are useful as the variance. Standard deviation is an example variance. In an alternative embodiment, the variance is a difference between a block's minimum and maximum pixel intensities.

In example embodiments, simple running sum calculations are employed in the mean and in the variance derivations. By implementing the example methods using simple running sum calculations, the need for memory or data storage can be reduced over other approaches. However, if memory size is not a critical parameter for a particular system, other calculations can be used to form alternative arrangements. For an example arrangement, a single memory element is used per decimated horizontal resolution, for each mean or variance value that is calculated. In one example, for a selected block size of 40×40 pixels, using an input array of size 1280×720 pixels for an image, only 1280/40=32 sums need to be stored as the mean is being calculated for each distinct block. Also, 32 more summations are stored for the variance calculated for each block.

Intermediate results for the mean, variance, maximum and minimum of each block are calculated as new pixels are received for that block. The intermediate results can be stored in relatively small first-in-first-out (FIFO) buffers. In the illustrative example described above, the FIFO requires up to 32 entries for each intermediate result type. When the input pixels per an image row give a non-integer number of blocks in a row of blocks, the last block can be ignored, because the size of this last block does not match the other blocks. The last block of each row of blocks can simply be ignored for mean and variance calculations, because any PWM artifact that might occur in this narrow border region of the image will not produce visible artifacts that are objectionable to the viewer.

After all of the image pixels for a particular block are evaluated, the final block mean, variance, maximum and minimum values are calculated. At this point the corresponding FIFO entries can be reset. As the processing continues in a raster scan manner, each time a row is reached where a new set of blocks begins, the prior summations can be reset and then overwritten with the summations calculated for subsequent blocks. This replacement of stored entries is possible because when the processing of the previous blocks is complete, the corresponding flag for each block has been set or cleared indicating whether displaying the block requires a fast or slow SLM load sequence. At this point the summations are now no longer needed for those blocks. The method of storing intermediate results for only the block currently being processed further helps minimize the amount of memory needed by the system. However, in an alternative system where memory size is not of critical importance, an entire image or larger portion of an image can be completely processed before resetting stored entries.

Figure 5:
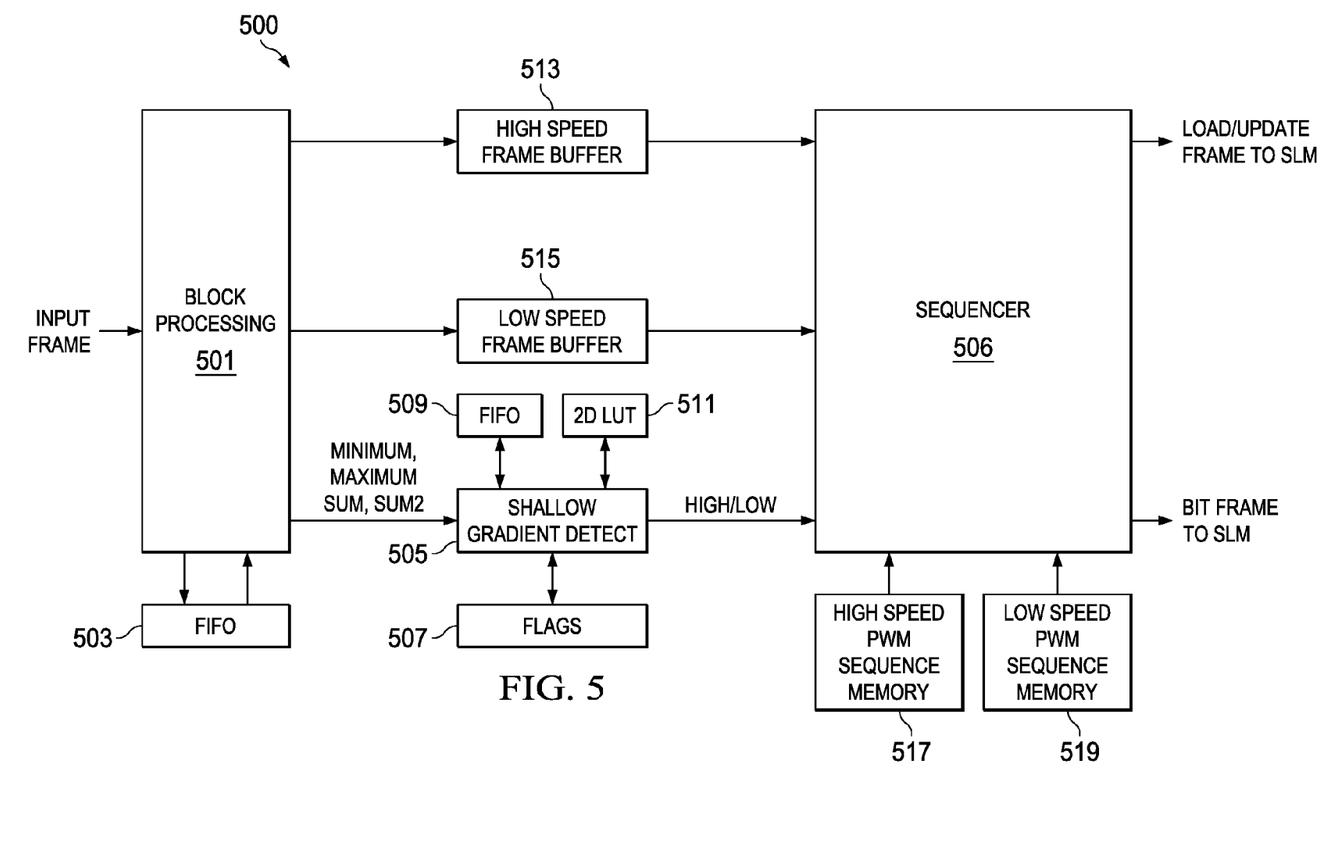
FIG. 5 is a block diagram for an embodiment for visible artifact reduction.

FIG. 5 is a block diagram for a system 500 illustrating the operation of an example embodiment. In FIG. 5, input frame data is received by block processing unit 501. The block processing unit 501 will receive the pixels for an image subdivided into blocks. For each block, each pixel will be evaluated. Running sum calculations will be made to determine the minimum, maximum, pixel intensity sum, and pixel intensity squared sum, all numeric quantities used by the SGD algorithm for each block. FIFO 503 is useful to store intermediate running sum quantities, such as the minimum, maximum, pixel sum, and pixel squared sum for each block as it is processed pixel by pixel. Other storage types are used in alternative embodiments.

The block running sum quantities are maintained for each block until the entire array of pixels for the particular block have been evaluated. At this point in the algorithm, the quantities minimum (MIN), maximum (MAX), pixel sum (SUM), and pixel squared sum (SUM2) are output to the shallow gradient detect block 505. The shallow gradient detect block 505 performs computations including determining the standard deviation (if used as the variance) and the mean for the current block, which can be stored temporarily in the FIFO 509. Using a two-dimensional lookup table labeled "2D LUT" and numbered 511 in FIG. 5, the shallow gradient detect block 505 determines whether a likelihood of visible artifacts is present for that block. The two-dimensional lookup table stores data corresponding to sensitivity values indicating the likelihood that a block with a particular mean and variance will exhibit a visible artifact. The mean and variance for the block are used to address the two-dimensional lookup table and retrieve the stored value. Based on the value retrieved from the two-dimensional lookup table, a flag is either set or cleared for each block and stored in the memory 507, labeled "Flags." Because the computations are done for each block, the variance and mean for the current block are unnecessary to continue storing, but can now be replaced with the variance and mean for the next successive blocks. The block flag is stored until the block processing for the current image is complete. Once the block processing is complete, the stored block flags can be cleared in preparation for processing additional blocks.

After all of the blocks in the current image are processed by Block Processing function 501 and the Shallow Gradient Detect block 505, a flag is either set or cleared for each block and stored in the memory labeled "Flags" in 507. The Shallow Gradient Detect function 505 can then determine a block sum by summing all of the set bits in the Flags 507 memory for the entire block. This block sum can be compared to a user programmable or fixed threshold that can be stored. This threshold can be stored in the 2D LUT 511 or in the FIFO 509. If the summed number of blocks for an image with set flags equals or exceeds the threshold, the signal "high/low" to the sequencer 505 will be set to "high," so the image for the current frame must be displayed using the short load times, with a higher data bandwidth and higher power. After the comparison to the threshold is made, the block flags are no longer needed and the "Flags" memory 507 can be cleared for use for the next image to be displayed.

Sequencer 506 controls the frame display data to be transmitted to an SLM. The sequencer 506 can retrieve bit plane data either from the high speed frame buffer 513, or from the low speed frame buffer 515, selectively. The retrieval selection is based on the high/low signal from the shallow gradient detect function 505. The sequencer 506 provides row data in a raster scan manner over a data interface labeled "Bit plane data to SLM" on a row-by-row basis. The sequencer 506 can use either a set of high speed PWM sequences, retrieved from a memory 517, or low speed PWM sequences, retrieved from a memory 519, depending on the value of the "high/low" output signal from the shallow gradient detect function 505.

The two-dimensional lookup table 511 is advantageous. By using both the mean and the variance to form the read address for the lookup table in the SGD algorithm, the decision whether to use fast or slow SLM load times can better capture the conditions in a display image that are most likely to cause visible PWM temporal contour artifacts. The approach used is important because the PWM temporal contours are much more sensitive to causing visible artifacts at some mean values than others. If the mean value for a block is in the vicinity of a code transition that is known to be susceptible to causing visible PWM artifacts, the other critical information needed is how the pixel values within the particular block spread over the range of codes that are likely to cause PWM artifacts. Accordingly, the variance indicates a likelihood that many pixels in the block on both sides of the PWM transition code will then cause a more significant likelihood of visible artifacts. The variance (e.g., standard deviation in the examples described hereinabove, or alternatively a different variance factor) can further quantify this spreading effect. Because both the mean and variance are important for determining whether a particular block is likely to cause visible PWM artifacts to appear in a displayed image (or in a portion of a displayed image), example embodiments use both the mean and the variance to address the two-dimensional lookup table 511, which contains the sensitivity indicators for the blocks. The combinations of mean and variance that are likely to cause visible artifacts have a set indicator in the lookup table, indicating a high bandwidth (fast DMD load time) sequence is needed for the particular block. Alternative arrangements that consider both the mean and variance to retrieve a value corresponding to the likelihood a visible artifact will occur are also useful with the embodiments. A two level addressing scheme using linked lists or other data structures can be used. The consideration of both the mean and variance in retrieving the value indicating the likelihood a visible artifact will occur can be implemented in a variety of data structure and data storage methods.

In an example embodiment where the variance used is the standard deviation, Equation 1 is used to determine the expected value:

$$E[X] = \mu tm \quad (1)$$

where E[X] is the expected value for a set of random variables with a mean µ.

Equation 2 gives the standard deviation, σ:

$$\sigma = \sqrt{E([X-\mu]^2)} = \sqrt{E[X^2] - (E[X])^2} \quad (2)$$

Equations 1 and 2 are used in an example embodiment with running sums. As the pixels of the selected block are individually examined, running sums form the mean and variance values needed to address a two-dimensional LUT during the SGD algorithm. The SGD algorithm computes an SLM load speed for each image to be displayed. In a three color system, the algorithm is performed for each color image that makes up the frame. For example, a red, green and blue image can be processed for a display frame.

In an example method, taking a color frame for each displayed color, the following values are recorded for each color:

1. The sum of pixel values
2. The sum of squared pixel values
3. The minimum of the pixel values
4. The maximum of the pixel values After these values are saved, and the last pixel of the selected block is processed, then the mean and the variance can be computed. In one example, the standard deviation is computed as the variance. In an alternative example, the difference between the maximum and the minimum pixel value for the block can be used as the variance, instead of the standard deviation. In an example using maximum and minimum as the variance, the sum of squared pixel values is unnecessary. Other computations that indicate the range of values can be used for the variance, and these arrangements form more alternative embodiments.

In an example of a red frame, the mean can be computed for a block using Equation 3:

Red_Mean=the sum of red pixel values×Scale_Factor (3)

where the Scale_Factor is a value greater than or equal to 1/# of pixels. In an example in an illustrative system, the value Red_Mean is a 30 bit value.

To make processing efficient and to better manage the memory space needed, in one example the red mean is shifted to remove up to N LSBs to create a smaller length value. This smaller value is more manageable in practical computing circuits. In one example, Equation 4 indicates the shift needed to leave a value of 8 bits to process:

Red_Mean_Shifted=shift Red_Mean to leave 8 bit value (4)

The sum of squares needed for the standard deviation computation is determined as a running sum as in Equation 5:

Red_Sum_of_Squares=sum of squared red pixel values×Scale_Factor (5)

where the Scale_Factor is a value greater than 1/# of pixels, and in one example,
Red_Sum_of_Squares is a 38 bit value.
The Red_Sum_of_Squares_Shifted is also shifted to remove the LSBs to create a smaller value for more efficient math in circuits. In an example, the Red_Sum_of_Squares_Shifted was shifted to leave just 16 bits.

The standard deviation (as an example variance) is then computed.

After the last pixel of the block is processed, the standard deviation Red_SD can be computed, using Equation 6:

Red_SD=SQRT [Red_Sum_of_Squares_Shifted− Red_Mean_Shifted$^2$] (6)

The standard deviation SD is computed for each color, such as red, green and blue, before display of the frame. In an alternative example, the standard deviation is not used for the variance. In another example, the difference between the maximum pixel value and the minimum pixel value for a block can be used as the variance.

The mean and the variance values for the block are pointers to address the two-dimensional LUT. After the indicator value for the block is retrieved from the two-dimensional lookup table, the block mean and variance values are no longer needed, and these values can be replaced with updated values for the next block. This replacement approach reduces the amount of memory needed to process an image. In an alternative arrangement for a system where memory is freely available, the block mean and variance values can be stored until all of the blocks are processed for a frame. A flag is set or cleared for each block based on the indicator value retrieved from the two-dimensional LUT. After all blocks are processed for the image, a total sum can be formed using the flag bits for the entire frame. The SGD algorithm of example embodiments compares the total sum to a defined threshold and determines whether to use the fast load time or a reduced load time to display the image frame.

The SGD algorithms of example embodiments determine whether to display the frame using a fast load time or using a slow load time for the SLM. In an example, the fast load time (higher power, shorter load time for DMD) used was 300 microseconds, while the slow load time (lower power, longer load time for DMD) used was 450 microseconds. In alternative arrangements, different load times are used. In other alternative arrangements, additional load times and corresponding PWM sequences are used. In examples, three, four or more differing load times can be used. Corresponding PWM sequences are stored for each of the different load times.

Programmable variables that can be customized by the user or system designer can include: the load times for the SLM; the sensitivity values as entered in the two-dimensional lookup table; the threshold summation value that determines when the fast load time is selected by the SGD algorithm; the block sizes used by the SGD algorithm; and the PWM sequences corresponding to the load times that the system uses for the spatial light modulator.

Figure 6:
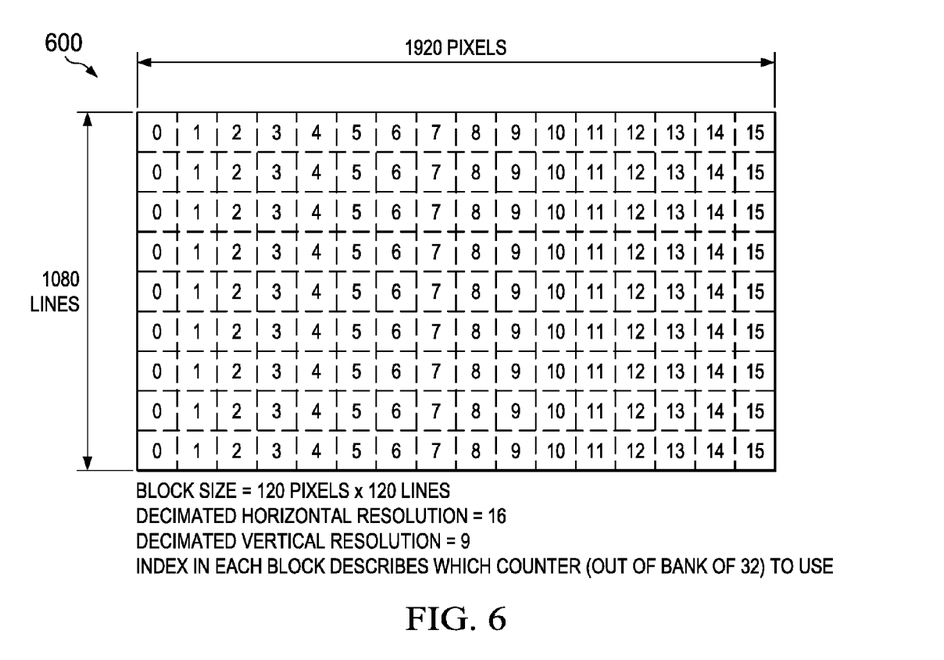
FIG. 6 illustrates in a graph a block partition arrangement for use with example embodiments.

FIG. 6 illustrates in a grid diagram 600 an arrangement of blocks using a block size of 120×120 for an example SLM array that is 1920 pixels wide by 1080 rows. In FIG. 6, the columns are shown divided into 16 columns labeled 0-15 (because 16×120=1920); and the rows are divided into 9 rows of 120 pixels (9×120=1080). Thus, the decimated horizontal resolution is 16, and the decimated vertical resolution is 9.

Figure 7:
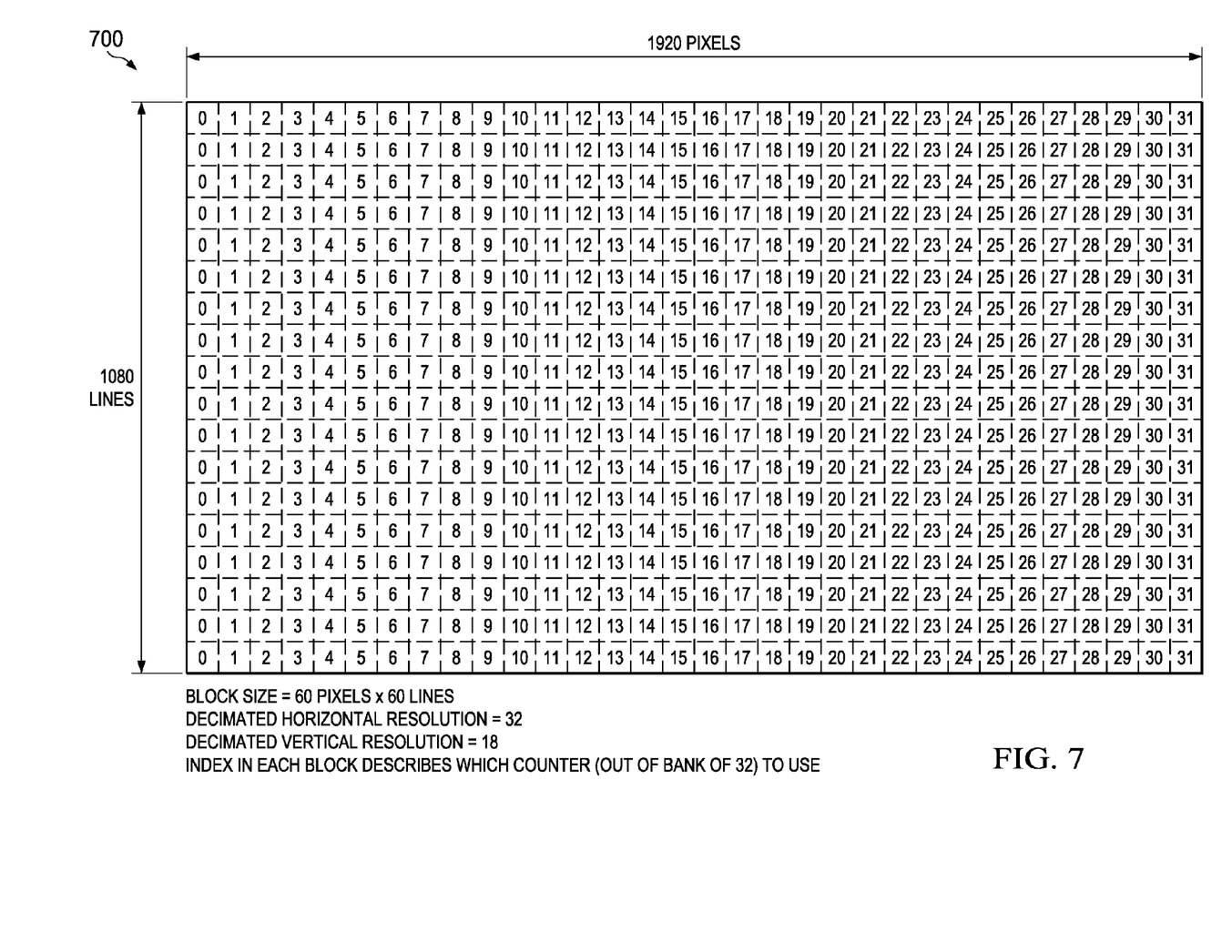
FIG. 7 is a graph showing an alternative block partition arrangement for use with example embodiments.

FIG. 7 illustrates, in a grid diagram 700, an arrangement of blocks using a block size of 60×60 in an array 1920 pixels wide by 1080 rows. In FIG. 7, the columns are divided into 32 columns 0-31 of 60 pixels each, 32×60=1920 pixels, and the rows are divided into 18 rows of 60 pixels each, 18×60=1080 rows. In this example, the decimated horizontal resolution is 32, and the decimated vertical resolution is 18.

Figure 8:
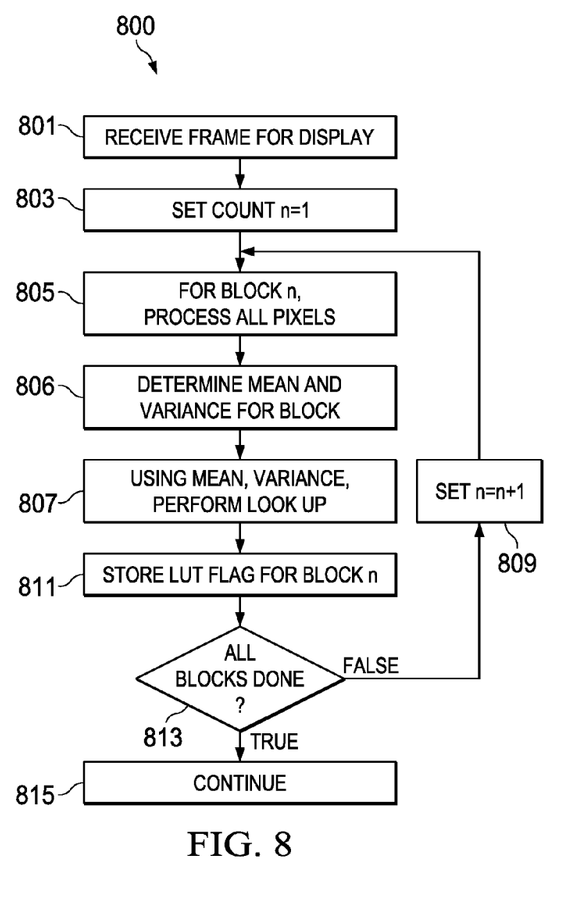
FIG. 8 is a flow diagram for a portion of a method to perform visible artifact reduction.

FIG. 8 is a flow diagram 800 for a portion of a method to perform visible artifact reduction. In step 801, a frame is received containing a two-dimensional array of pixel values arranged in rows and columns for processing and display. At step 803 a counter is set to a start value. The counter can be set to one (when counting from one to the total number of blocks, alternatively, a count could be set to the maximum number and used as a countdown counter, in still another approach the counting can begin at zero, instead of one, and then increment to the total-one). At step 805, the current block is processed. Each pixel in the block is processed, and a running sum is kept. Also, if the variance is standard deviation, then each pixel is squared, and a running sum of pixel squared values is kept. Or, if the variance is minimum and maximum, then the squared values are unnecessary. While processing the pixels, a maximum and a minimum pixel value can be kept for the block. If the variance to be used is the standard deviation, the pixel squared values will be used with the mean to compute the standard deviation for the block. If the variance to be used is a difference between maximum and minimum pixel values, the maximum and minimum values will be used instead of the pixel squared values.

At step 806, the running sum information for the block is used to calculate the mean and the variance. For example, the variance can be the standard deviation. Alternatively the variance can be the difference between the maximum and minimum values, and in that case, computing the standard deviation is unnecessary. At step 807, the mean and variance are used as pointers to access the two-dimensional lookup table. The two-dimensional lookup table (LUT) contains an indicator for each combination of the pixel mean and variance information. The indicator indicates whether a visible artifact is likely to occur when displaying the particular block. The indicators in the two dimensional LUT can be set by a user and can be modified to adapt the system.

At step 811, the flag corresponding to the indicator retrieved from the LUT is stored in a results table for the particular block. At step 813, a decision test determines whether all of the blocks for the frame have been processed. If the determination at step 813 is true (as indicated by the letter "T" in FIG. 8), the method continues in FIG. 9. If further blocks remain to be analyzed, the determination is false at step 813 (as indicated by the letter "F" in FIG. 8), and the method returns to step 809, the counter "n" is incremented, and the block analysis continues.

Figure 9:
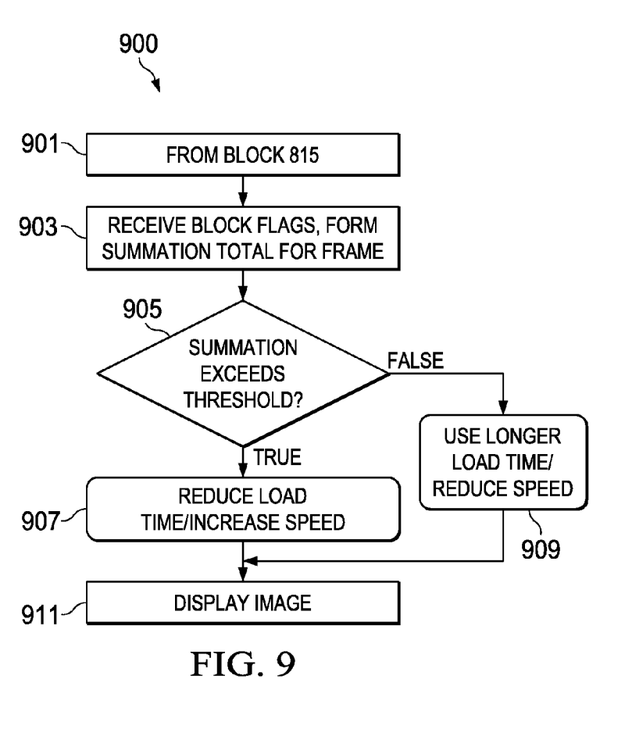
FIG. 9 is a flow diagram for another portion of a method to perform visible artifact reduction.

FIG. 9 is a flow diagram 900 for another portion of the method to perform the SGD algorithm. At step 901, the method continues from step 815 in FIG. 8. At this point, the blocks have all been processed, and a flag for each block (indicating whether a visible PWM temporal contour artifact is likely to occur) is either set or cleared. At step 903, the number of set flags is counted (or the set flag values are added) to form a summation total for the frame. At step 905, a decision step compares the summation total to a threshold value. This threshold can be predefined, or can be user programmable. In some arrangements, the threshold can be programmed by modifying a register, counter or by writing to a memory location. If the comparison is true (as indicated by the "T" in FIG. 9), the method transitions to step 907, and the faster speed, or reduced SLM load time, is used. If the comparison in step 905 is false (indicated by an "F" in FIG. 9), the method transitions to step 909, and a slower speed, longer load time for the SLM is used. At step 911, the image is displayed at the SLM using the appropriate load time.

Figure 10:
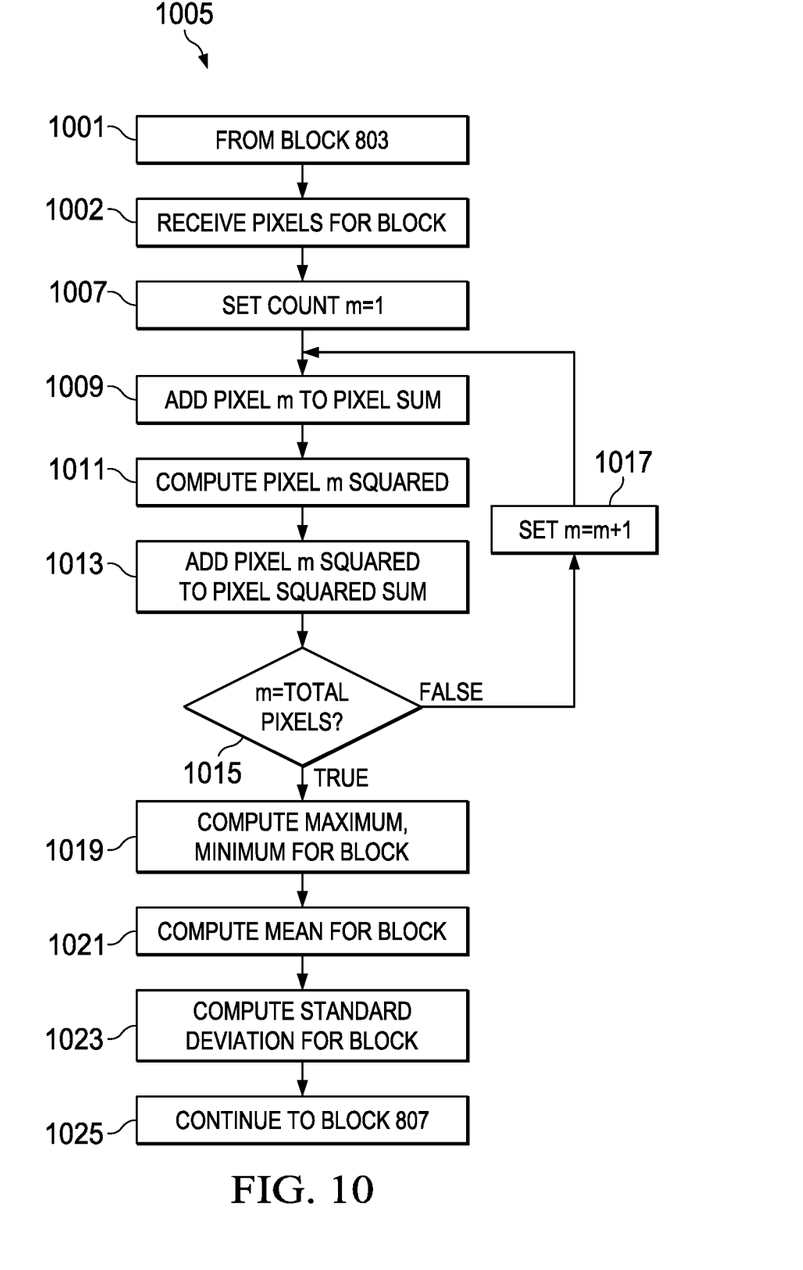
FIG. 10 is a flow diagram for another portion of an additional method to perform visible artifact reduction.

FIG. 10 is a flow diagram 1005 for another portion of an additional method to implement the block processing, such as shown in block 805 of FIG. 8. In FIG. 10, the method begins at step 1001 by receiving the image data from step 803 of FIG. 8. In step 1002, the pixels for a particular block are received for processing. At step 1007, a counter is set to one, for example, or alternatively the counter can be set to zero or to a maximum count when the counter is configured as a countdown counter. At step 1009, the pixel selected by the counter m is added to the running pixel sum. At step 1011, the pixel selected by the counter m is squared, and the squared value is added to the running pixel squared sum. Although not detailed in the blocks 1009, 1013, both the pixel sum and the pixel squared sum are shifted to eliminate some of the least significant bits to form shortened numbers for more efficient digital processing, as described hereinabove.

At step 1015, a decision block tests whether all of the pixels in the block have been analyzed in that manner. For such analysis, various block sizes may be used to form partitioned areas of a frame, such as blocks of size 120×120 (14400 pixels) and/or 60×60 (3600 pixels). If any pixels in the block remain to be analyzed, then the process continues from step 1015 to step 1017, which increases the counter m value. After step 1017, the method returns to step 1009.

After the method completes such analysis of all pixels in the block, the decision step 1015 will be true, and the method will continue from step 1015 to step 1019, where the maximum and minimum pixel values are completed. At step 1021, the mean is computed as described above by dividing the pixel sum value by at least the number of pixels in the block. At step 1023, the mean and the squared pixel sum are used to compute the standard deviation (or, in alternative arrangements, another variance metric can be computed instead). At step 1025 the method continues to step 807 in FIG. 8 to complete the SGD algorithm.

The method shown in FIG. 10 implements the running sum equations described as Equations 3-6 above. However, the mean and variance can be computed using alternative computing approaches, obtaining the mean and variance for each block, while still implementing the SGD algorithm. After the mean and variance are obtained, the two-dimensional lookup table can be accessed and the sensitivity indicator information can be read for the particular block being processed, as described above. The example algorithms can be performed using programmable circuitry, such as DSPs, microprocessors, microcontrollers, CPUs and floating point units. Because the image data needs to be processed in a timely manner, so the images can be displayed within a certain frame display time, implementations can be formed using dedicated hardware circuitry that performs the functions on a raster scan basis, because dedicated hardware can often perform computing operations faster than a programmable device running software.

Figure 11:
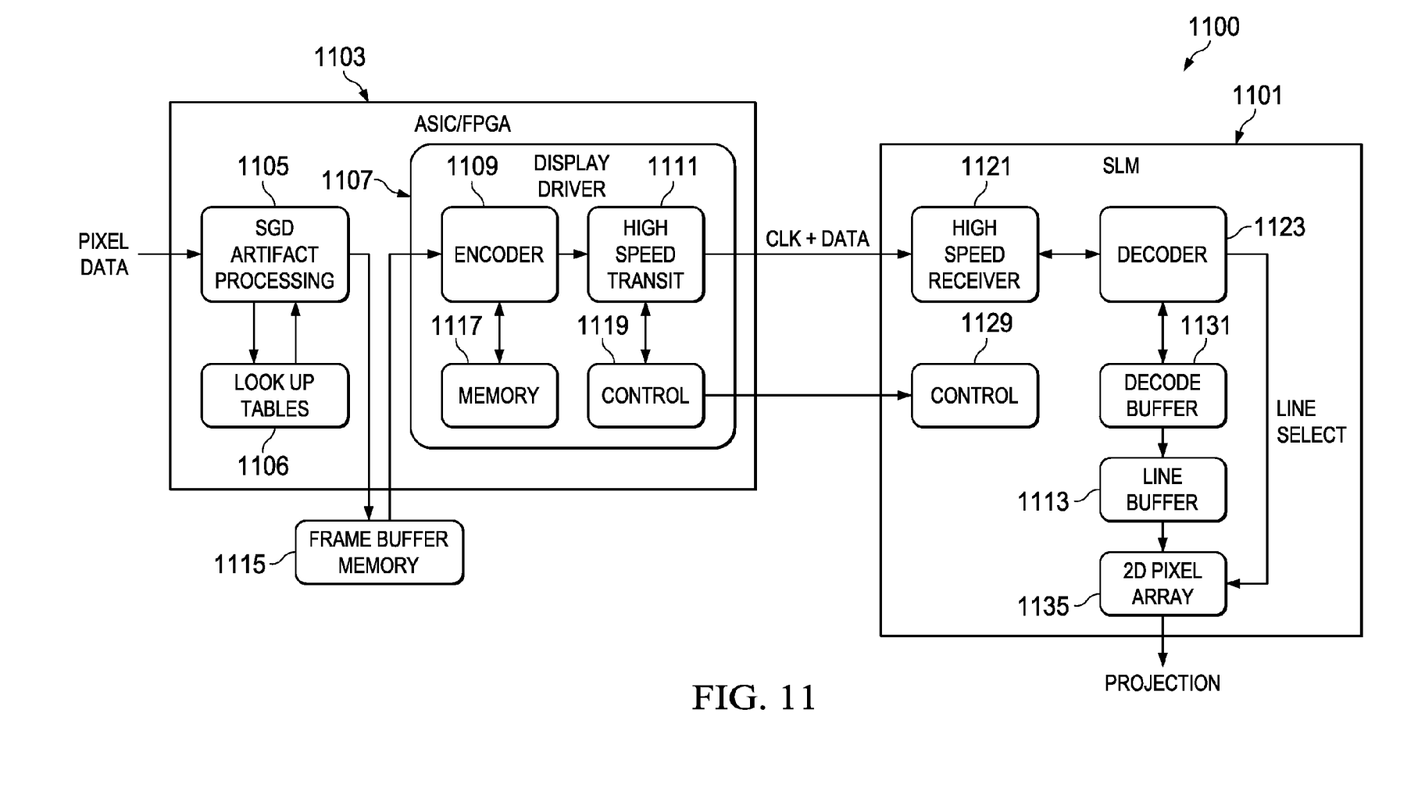
FIG. 11 is a block diagram for a system incorporating an embodiment to perform visible artifact reduction.

FIG. 11 is a block diagram for a system 1100 incorporating an embodiment. The various blocks of FIG. 11 are described by the function performed. These blocks can be implemented using dedicated hardware, such as dedicated logic gates arranged in the digital controller or ASIC. Alternatively, digital circuity can be used, such as registers, stacks, multipliers, ALUs and comparators. In other alternative embodiments, the blocks shown in FIG. 11 can be formed using programmable logic including controllers or microprocessors within the digital controller or ASIC. Also, instructions needed to cause the blocks to perform the functions described can be stored within the ASIC or can be stored in an external program memory. These instructions can be provided as: firmware; machine code; software. If the instructions are not stored within the ASIC, an external memory can be provided and coupled to the ASIC. Nonvolatile memory can be used, such as a FLASH, ROM, EEPROM or other memory suitable for storing and retrieving program instructions.

In FIG. 11, ASIC/FPGA 1103 receives pixel data for processing. The block 1105 performs bit plane processing including performing the SGD algorithm methods described hereinabove. The block 1105 uses memory to store the lookup tables in block 1106. Alternatively, the lookup tables can be stored in external memory devices. The SGD artifact processing block 1105 stores bit plane data into the image frame buffer 1115 that contains data corresponding to frames for display. A display driver 1107 fetches data for display from the image frame buffer 1115. This data can be encoded at block 1109 for transmission to the SLM 1101. A local memory 1117 is used with encoder 1109, while the high-speed transmission block 1111 and control 1119 are used to place the data on a high speed interface to the SLM 1101.

SLM 1101 includes a high speed receiver 1121 for receiving the image data, a decoder 1123 for decoding the encoded image data, and a set of buffers for storing decoded lines in 1131, collecting lines in line buffer 1113, and loading the pixel memory in the SLM in block 1135. After the bit plane is loaded into the pixel memory, the frame is displayed by illuminating the SLM and reflected light corresponding to the frame is output to the projection optics. The SGD algorithms described above will be used with the ASIC 1103 to provide data, control and clock information from control block 1119 in ASIC 1103, and from the high speed transmit buffer 1111 in ASIC 1103, at a fast load rate, or a slow load rate, depending on the outcome of the SGD algorithms described above. In this manner, the image projected by the SLM 1101 will be free from visible PWM contour artifacts.

Use of the adaptive SGD algorithms of example embodiments results in a reduction in power consumption (compared to conventional approaches), while still providing a reduction of or total elimination of visible PWM temporal contour artifacts.

Modifications are possible in the described embodiments, and other embodiments are possible, within the scope of the claims.

What is claimed is:

1. A method, comprising:
   receiving an array of image data pixels for display by a spatial light modulator, wherein each pixel has respective first, second and third color components;
   dividing the array of image data pixels into a plurality of blocks;
   per block of the plurality of blocks: computing a first mean value of the first color component for the pixels in the block; computing a second mean value of the second color component for the pixels in the block; computing a third mean value of the third color component for the pixels in the block; computing a first variance of the first color component for the pixels in the block; computing a second variance of the second color component for the pixels in the block; computing a third variance of the third color component for the pixels in the block; and, in response to the first, second and third mean values and the first, second and third variances, retrieving at least one respective indicator of a likelihood of a visible artifact for the block;
   computing an aggregate indicator in response to the retrieved respective indicators for all of the blocks; and
   in response to the computed aggregate indicator, outputting a signal to adjust a time between successive loadings of the spatial light modulator for displaying the array of image data pixels, wherein the likelihood of the visible artifact is reduced by reducing the time between the successive loadings, and the likelihood of the visible artifact is increased by increasing the time between the successive loadings.

2. The method of claim 1, wherein the visible artifact is a visible pulse width modulation temporal contour artifact.

3. The method of claim 1, wherein the array is a two-dimensional array.

4. The method of claim 1, wherein retrieving the respective indicators comprises: using the mean values and the variances as address values to retrieve the respective indicators from a memory.

5. The method of claim 1, wherein outputting the signal comprises:
   per block, in response to the retrieved at least one respective indicator, selectively clearing or setting at least one respective binary flag for the block, wherein the at least one respective binary flag is stored in a memory;
   summing the respective binary flags to form a summation value;
   comparing the summation value to a threshold value; and
   responsive to the comparing, outputting the signal.

6. The method of claim 1, further comprising:
   displaying the array of image data pixels via the spatial light modulator.

7. The method of claim 1, wherein computing the first mean value of the first color component comprises:
   per pixel in the block, adding an intensity value of the first color component of the pixel to a running sum of pixel intensity values.

8. The method of claim 7, wherein computing the first mean value of the first color component comprises:
   computing the first mean value of the first color component by dividing the running sum of pixel intensity values by at least a number of pixels in the block.

9. The method of claim 1, wherein computing the first variance of the first color component comprises:
   per pixel in the block, computing a squared intensity value of the first color component of the pixel, and adding the squared intensity value to a running sum of squared intensity values.

10. The method of claim 9, wherein computing the first variance of the first color component comprises:
    computing a standard deviation for the block, in response to the first mean value and the running sum of squared intensity values.

11. The method of claim 10, wherein computing the standard deviation comprises:
    computing the standard deviation as a square root of: the running sum of squared intensity values minus the first mean value squared.

12. The method of claim 1, wherein computing the first variance of the first color component comprises:
    computing a difference between a maximum pixel intensity value of the first color component in the block and a minimum pixel intensity value of the first color component in the block.

13. The method of claim 1, wherein the method is performed separately for each of the first, second and third color components in the array of image data pixels.

14. The method of claim 1, wherein the spatial light modulator is one of: a digital micromirror device; and a liquid-crystal-on-silicon device.

15. A system for displaying images, the system comprising:

a spatial light modulator to display an array of image data pixels, wherein each pixel has respective first, second and third color components; and a controller circuit to adjust a time between successive loadings of the spatial light modulator for displaying the array of image data pixels, wherein a likelihood of a visible artifact is reduced by reducing the time between the successive loadings, and the likelihood of the visible artifact is increased by increasing the time between the successive loadings;

wherein the controller circuit is configured to adjust the time between the successive loadings by performing steps including:

dividing the array of image data pixels into a plurality of blocks;

per block of the plurality of blocks: computing a first mean value of the first color component for the pixels in the block; computing a second mean value of the second color component for the pixels in the block; computing a third mean value of the third color component for the pixels in the block; computing a first variance of the first color component for the pixels in the block; computing a second variance of the second color component for the pixels in the block; computing a third variance of the third color component for the pixels in the block; and, in response to the first, second and third mean values and the first, second and third variances, retrieving at least one respective indicator of the likelihood of the visible artifact for the block;

computing an aggregate indicator in response to the retrieved respective indicators for all of the blocks; and in response to the computed aggregate indicator, outputting a signal to adjust the time between the successive loadings.

16. The system of claim 15, wherein the visible artifact is a visible pulse width modulation temporal contour artifact.

17. The system of claim 15, wherein retrieving the respective indicators comprises:

using the mean values and the variances as address values to retrieve the respective indicators from a memory.

18. The system of claim 15, wherein outputting the signal comprises:

per block, in response to the retrieved at least one respective indicator, selectively clearing or setting at least one respective binary flag for the block, wherein the at least one respective binary flag is stored in a memory;

summing the respective binary flags to form a summation value;

comparing the summation value to a threshold value; and responsive to the comparing, outputting the signal.

19. The system of claim 15, wherein computing the first mean value of the first color component comprises:

per pixel in the block, adding an intensity value of the first color component of the pixel to a running sum of pixel intensity values.

20. The system of claim 19, wherein computing the first mean value of the first color component comprises:

computing the first mean value of the first color component by dividing the running sum of pixel intensity values by at least a number of pixels in the block.

21. The system of claim 15, wherein computing the first variance of the first color component comprises:

per pixel in the block, computing a squared intensity value of the first color component of the pixel, and adding the squared intensity value to a running sum of squared intensity values.

22. The system of claim 21, wherein computing the first variance of the first color component comprises:

computing a standard deviation for the block, in response to the first mean value and the running sum of squared intensity values.

23. The system of claim 22, wherein computing the standard deviation comprises:

computing the standard deviation as a square root of: the running sum of squared intensity values minus the first mean value squared.

24. The system of claim 15, wherein computing the first variance of the first color component comprises:

computing a difference between a maximum pixel intensity value of the first color component in the block and a minimum pixel intensity value of the first color component in the block.

25. The system of claim 15, wherein the spatial light modulator is one of: a digital micromirror device; and a liquid-crystal-on-silicon device.

* * * * *